(12) United States Patent
Alvarez et al.

(10) Patent No.: US 8,955,532 B2
(45) Date of Patent: Feb. 17, 2015

(54) VALVE WITH A REMOVABLE CARTRIDGE

(75) Inventors: Raphael Alvarez, Geneva (CH); Frank Oelgarth, Divonne les bains (FR)

(73) Assignee: Fluid Automation Systems S.A, Versoix (CH)

( * ) Notice: Subject to any disclaimer, the term of this patent is extended or adjusted under 35 U.S.C. 154(b) by 522 days.

(21) Appl. No.: 13/394,372

(22) PCT Filed: Sep. 20, 2010

(86) PCT No.: PCT/EP2010/005743
§ 371 (c)(1),
(2), (4) Date: Mar. 6, 2012

(87) PCT Pub. No.: WO2011/032723
PCT Pub. Date: Mar. 24, 2011

(65) Prior Publication Data
US 2012/0161050 A1 Jun. 28, 2012

(30) Foreign Application Priority Data
Sep. 18, 2009 (FR) ..................................... 09 56439

(51) Int. Cl.
*F16K 31/06* (2006.01)
(52) U.S. Cl.
CPC ......... *F16K 31/0651* (2013.01); *F16K 31/0655* (2013.01); *F16K 31/0679* (2013.01)
USPC .................... 137/15.18; 251/129.09; 335/256

(58) Field of Classification Search
USPC .................... 251/129.09, 129.15; 137/15.18; 335/256
See application file for complete search history.

(56) References Cited

U.S. PATENT DOCUMENTS

| | | | | |
|---|---|---|---|---|
| 1,976,625 | A | * | 10/1934 | Neumann ................ 251/129.09 |
| 2,550,297 | A | * | 4/1951 | Ray ........................... 251/129.09 |
| 3,133,234 | A | * | 5/1964 | Dietz ........................ 251/129.09 |
| 4,114,852 | A | | 9/1978 | Fournier |
| 4,447,234 | A | | 5/1984 | Mayfield |
| 5,035,360 | A | * | 7/1991 | Green et al. ............ 251/129.09 |
| 5,156,184 | A | | 10/1992 | Kolchinsky |
| 2008/0078462 | A1 | | 4/2008 | Minervini et al. |

FOREIGN PATENT DOCUMENTS

| | | |
|---|---|---|
| DE | 10306001 A1 | 11/2003 |
| WO | 8302811 A1 | 8/1983 |

* cited by examiner

*Primary Examiner* — John Bastianelli
(74) *Attorney, Agent, or Firm* — The Ollila Law Group LLC

(57) ABSTRACT

A valve (100) is provided. The valve (100) includes a base portion (10). The base portion (10) includes one or more solenoid coils (101A, 101B) and one or more cartridge receivers (104, 104') coupled to the one or more solenoid coils (101A, 101B). The valve (100) also includes one or more removable cartridges (103). A removable cartridge (103) of the one or more removable cartridges includes a magnetic core (210) and a movable armature (211). A removable cartridge (103) of the one or more removable cartridges is adapted to removably engage the one or more cartridge receivers (104, 104').

19 Claims, 7 Drawing Sheets

VALVE WITH A REMOVABLE CARTRIDGE

TECHNICAL FIELD

The present invention relates to, valves, and more particularly, to a valve with a removable cartridge.

BACKGROUND OF THE INVENTION

Fluid handling devices are becoming increasingly popular and there is an increased demand for fluid handling devices which are both portable and easy to use. Portable fluid handling devices are being used for applications such as home care, point of care testing, fuel cells, fragrance dispensers, etc. In addition, there are many applications that require the fluid contacting elements of the fluid handling device to remain sanitary, such as in medical applications. One method of ensuring the fluid contact surfaces remain sanitary is by providing a disposable valve, i.e., a single use or limited time use valve. However, it is undesirable to dispose of the entire valve due to the excessive costs and waste that a user would incur. Therefore, prior art attempts have provided valves that include both a reusable portion and a disposable portion. Generally, the reusable portion consists of the valve elements that are not in contact with the fluid, while the disposable portion of the valve comprises those elements that may contact the fluid.

One example of such as valve is a pinch valve. In general, pinch valves operate by compressing a soft tube in order to close a fluid flow path. While the pinch valve can operate adequately in limited environments, the pinch valve has a number of drawbacks. One problem with pinch valves is that the energy efficiency of the valve is generally poor. One reason for the inefficiency of the valve is that a relatively large force is required to compress the tubing, resulting in excessive energy consumption. Furthermore, the valve often suffers from inadequate fluid closure of the tubing. Therefore, in many applications, the pinch valve is not a reliable or an acceptable solution.

Solenoid actuated poppet valves, on the other hand, have received great acceptance in a wide variety of industries due to their efficiency and general applicability. However, the coils of a solenoid valve can be expensive and therefore, solenoid valves have generally been overlooked in sanitary environments that would require a disposable valve.

The present invention overcomes this and other problems and an advance in the art is achieved. The present invention provides a solenoid operated valve that includes a reusable portion, such as the solenoid coils and a removable portion, such as the portion in contact with the fluid. Advantageously, the present invention can provide sanitary conditions without the added cost typically associated with disposable valves.

SUMMARY OF THE INVENTION

A valve is provided according to an embodiment of the invention. The valve includes a base portion and one or more removable cartridges. The base portion includes one or more solenoid coils and one or more cartridge receivers. The one or more cartridge receivers are coupled to the one or more solenoid coils. A removable cartridge of the one or more removable cartridges includes a magnetic core and a movable armature. According to an embodiment of the invention, a removable cartridge of the one or more removable cartridges is adapted to removably engage the one or more cartridge receivers.

A method for forming a valve is provided according to an embodiment of the invention. The valve includes a base portion and one or more removable cartridges. The base portion includes one or more solenoid coils and one or more cartridge receivers. A removable cartridge of the one or more removable cartridges includes a magnetic core and a movable armature. The method comprises the step of inserting a portion of the removable cartridge into the one or more cartridge receivers.

Aspects

According to an aspect of the invention, a valve comprises:
 a base portion including one or more solenoid coils and one or more cartridge receivers coupled to the one or more solenoid coils; and
 one or more removable cartridges with a removable cartridge of the one or more removable cartridges including a magnetic core and a movable armature, a removable cartridge of the one or more removable cartridges being adapted to removably engage the one or more cartridge receivers.

Preferably, the valve further comprises one or more latching arms adapted to retain the removable cartridge in the cartridge receivers.

Preferably, the removable cartridge further comprises a sealing member and a fluid orifice.

Preferably, the valve further comprises a fluid flow path formed in the magnetic core and the movable armature.

Preferably, the removable cartridge is adapted to engage the one or more cartridge receivers in a direction generally perpendicular to the fluid flow path.

Preferably, the valve further comprises a housing substantially surrounding the movable armature and forming a fluid tight seal with the magnetic core.

Preferably, the valve further comprises a diaphragm coupled to the movable armature and adapted to engage a valve seat when the movable armature is in a first position.

Preferably, the diaphragm closes a fluid flow path between a fluid inlet and a fluid outlet when engaged with the valve seat.

Preferably, the valve further comprises a biasing member coupled to the movable armature and adapted to bias the movable armature in a first direction.

Preferably, the base portion comprises two solenoid coils separated by the one or more cartridge receivers and wherein the removable cartridge is positioned between the two solenoid coils.

Preferably, the valve further comprises a first and a second nozzle extending from a first and a second end of the removable cartridge.

Preferably, the removable cartridge further comprises a filter.

Preferably, the removable cartridge further comprises a check valve.

Preferably, the removable cartridge further comprises a needle.

Preferably, the removable cartridge further comprises one or more conduits.

According to another aspect of the invention, a method for forming a valve including a base portion including one or more solenoid coils and one or more cartridge receivers, and one or more removable cartridges with a removable cartridge of the one or more removable cartridges including a magnetic core and a movable armature, the method comprises the step of:
 inserting a portion of a removable cartridge of the one or more removable cartridges into the one or more cartridge receivers.

Preferably, the method further comprises the step of moving one or more latching arms coupled to the one or more cartridge receivers from a first position to a second position to retain the removable cartridge in the one or more cartridge receivers.

Preferably, the step of inserting a portion of the removable cartridge comprises engaging the removable cartridge with the one or more cartridge receivers in a direction perpendicular to a longitudinal axis of the removable cartridge.

Preferably, the step of inserting a portion of the removable cartridge into the one or more cartridge receivers comprises inserting a first and second reduced neck portion into a first and second cartridge receiver.

Preferably, the method further comprises the step of coupling one or more fluid conduits to a first and second nozzle coupled to the removable cartridge.

DETAILED DESCRIPTION OF THE INVENTION

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
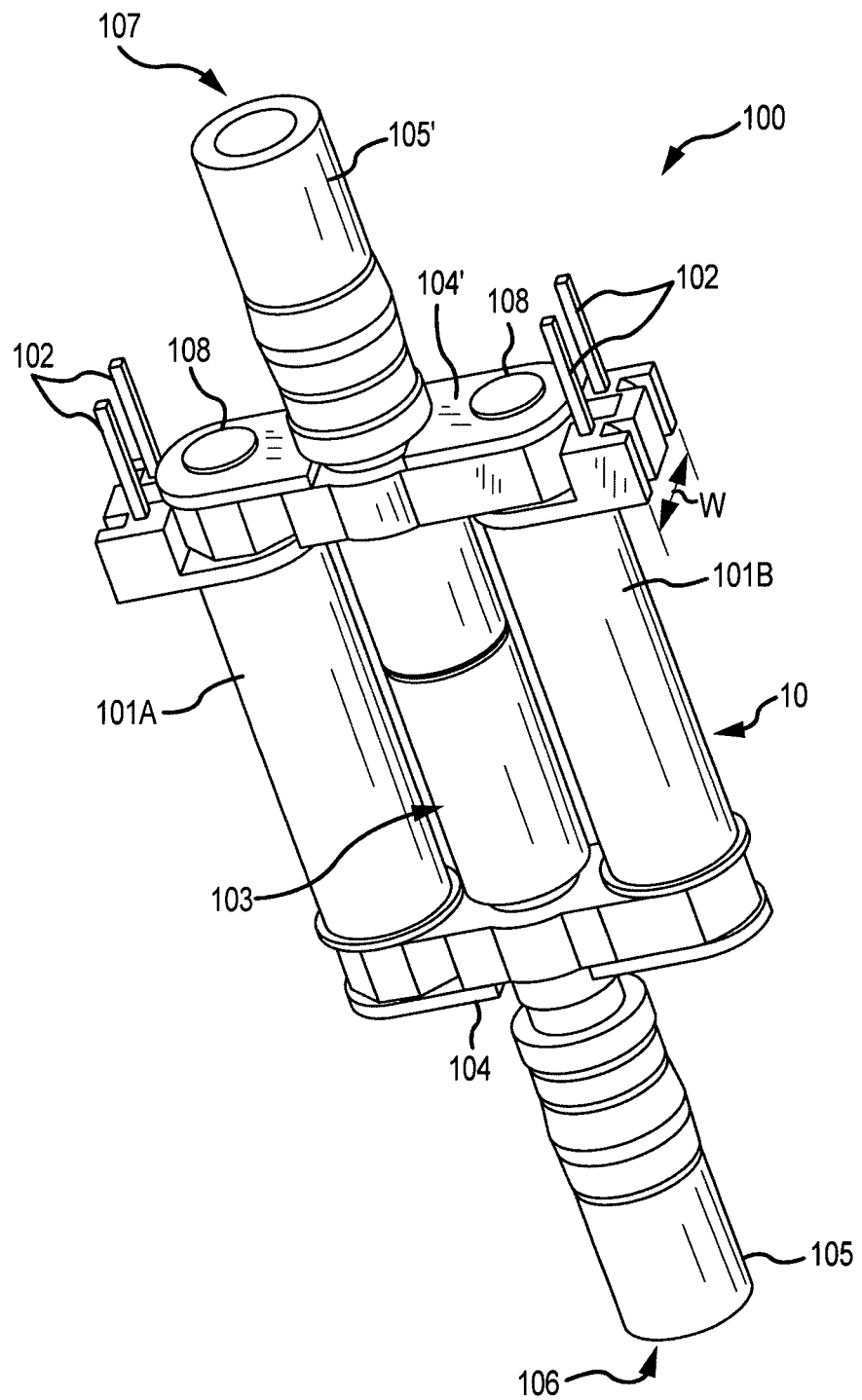
FIG. 1 shows a valve with a removable cartridge according to an embodiment of the invention.

FIG. 1 shows a valve 100 according to an embodiment of the invention. The valve 100 is shown in FIG. 1 with a base portion 10 and a removable cartridge 103 coupled together. It should be appreciated that the valve 100 may also include a case or other protective covering that is not shown in the figures in order to reduce the complexity of the drawing. According to an embodiment of the invention, the valve 100 comprises a solenoid actuated valve. In the embodiment shown, the base portion 10 includes a first coil 101A, a second coil 101B, one or more electrical contacts 102, and one or more cartridge receivers 104, 104'.

The valve 100 also includes one or more removable cartridges 103, which is discussed further below. While only one removable cartridge is described and shown, it should be appreciated that more than one removable cartridge 103 may be provided. According to an embodiment of the invention, the removable cartridge 103 can be coupled to an inlet conduit 105 at the inlet end 106 and an outlet conduit 105' at the outlet end 107. It should be appreciated that only a portion of the conduits 105, 105' are shown and in practice, the conduits 105, 105' may be much longer than shown. The removable cartridge 103 may be removably coupled to the conduits 105, 105' or substantially permanently coupled to the conduits 105, 105'. In use, the valve 100 can be used to control the fluid delivery through the conduits 105, 105'. It should be appreciated that in use, the inlet and outlet may be reversed. In other words, fluid may flow into the valve 100 through the end 107 and out of the valve 100 through the end 106.

According to an embodiment of the invention, the removable cartridge 103 is adapted to engage the one or more cartridge receivers 104, 104'. In the embodiment shown, two cartridge receivers 104 and 104' are shown, with one cartridge receiver 104 located proximate a fluid inlet 106 and the other cartridge receiver 104' being located proximate a fluid outlet 107. It should be appreciated that while two cartridge receivers 104, 104' are shown, the valve 100 may include a single cartridge receiver or more than two cartridge receivers. Therefore, the particular number of cartridge receivers should not limit the scope of the present invention. According to an embodiment of the invention, the cartridge receivers 104, 104' are positioned between the first and second coils 101A, 101B. According to an embodiment of the invention, the cartridge receivers 104, 104' are coupled to the first and second coils 101A, 101B. According to some embodiments, the cartridge receivers 104, 104' can also be used to retain the first and second coils 101A, 101B at a fixed distance and/or orientation from one another. The cartridge receivers 104, 104' may be coupled to the first and second coils 101A, 101B using fasteners 108, for example. The fasteners 108 corresponding to the first cartridge receiver 104 are not visible in the figures. It should be appreciated that while two coils 101A, 101B are shown, in other embodiments, only one coil is used. In still further embodiments, more than two coils may be implemented. Therefore, the particular number of coils should not limit the scope of the present invention. According to an embodiment of the invention, the use of a double coil system, such as shown in the figures, allows the valve 100 to be utilized with higher flow rates/fluid pressures. This is because for a given valve width, W, two coils can provide a greater force than a single coil system. As a result, a greater fluid opening can be provided thereby allowing for a greater flow rate through the valve.

According to an embodiment of the invention, the coils 101A, 101B can be coupled to the electrical contacts 102. The electrical contacts 102 can be connected to a power supply (not shown) in order to operate the valve 100 by energizing the coils 101A, 101B. Operation of the valve 100 is described in more detail below.

Figure 2:
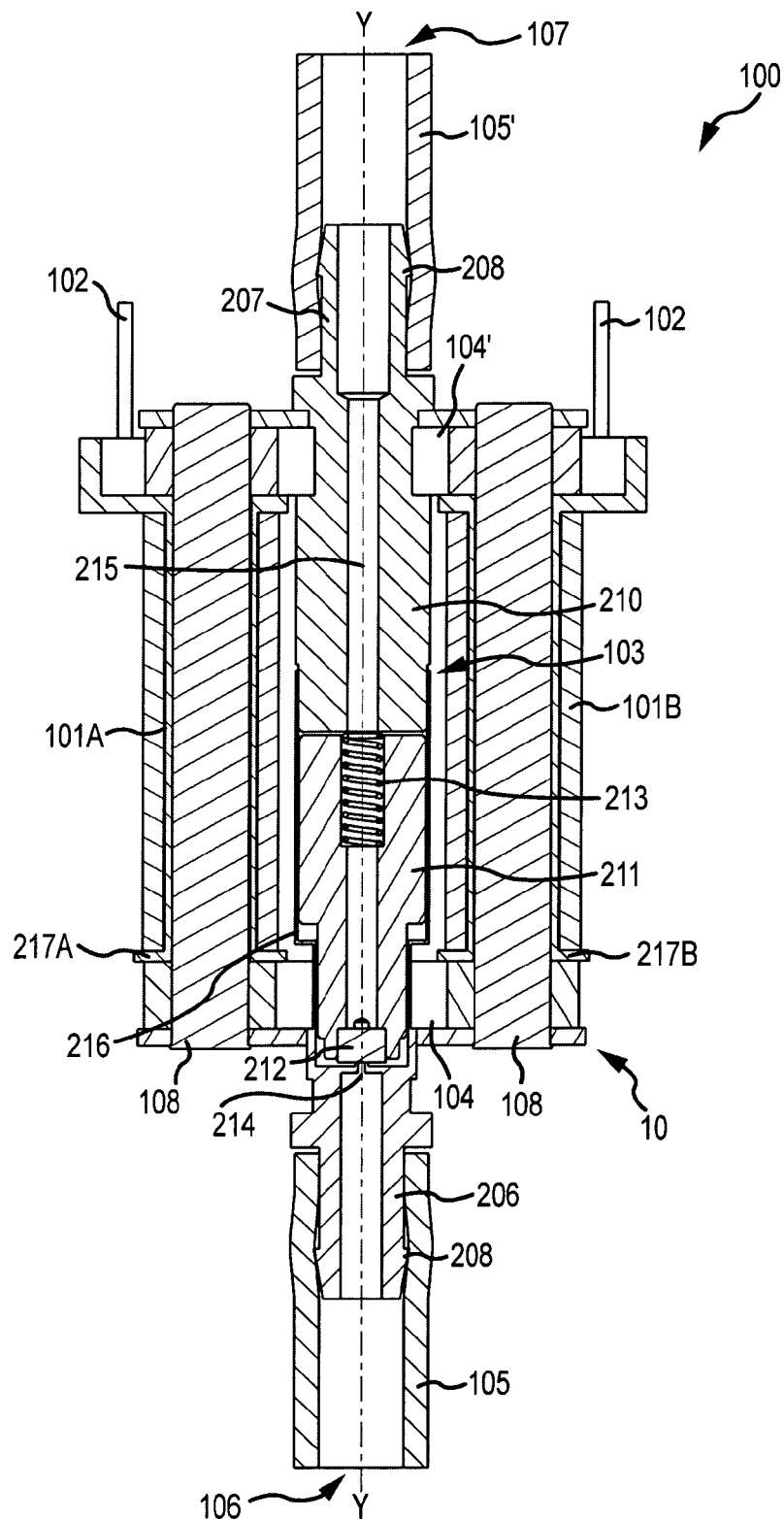
FIG. 2 shows a cross-sectional view of the valve according to an embodiment of the invention.

FIG. 2 shows a cross-sectional view of the valve 100 according to an embodiment of the invention. The internal components of the valve 100 are now visible. As can be seen, the removable cartridge 103 includes a magnetic core 210, a movable magnetic armature 211, a housing 216 substantially surrounding the movable armature 211, a sealing member 212, an orifice 214, and a biasing member 213. In addition, the removable cartridge 103 can also include an inlet nozzle 206 and an outlet nozzle 207 at the inlet 106 and outlet 107, respectively. According to an embodiment of the invention, the inlet 106 and the outlet 107 are located along a longitudinal axis Y-Y of the removable cartridge 103. According to an embodiment of the invention, the longitudinal axis Y-Y extends substantially parallel to the internal fluid channel 215 formed in the magnetic core 210 and the movable armature 211. In some embodiments, the fluid channel 215 lies on the longitudinal axis Y-Y; however, this is not always the situation (See FIG. 6).

According to an embodiment of the invention, the nozzles 206, 207 at the inlet 106 and outlet 107 can include barbs 208. As those skilled in the art can readily appreciate, the barbs 208 can be adapted to retain the fluid conduits 105, 105'. It should be appreciated that the nozzles 206, 207 do not have to include the barbs 208 and in other embodiments the fluid conduits 105, 105' can be retained using alternative methods.

According to an embodiment of the invention, once the removable cartridge 103 is fully engaged with the one or more cartridge receivers 104, 104', the coils 101A, 101B can be energized in order to actuate the valve 100. According to the embodiment shown, the coils 101A, 101B surround the fasteners 108 as well as coil holders 217A, 217B. Therefore, in some embodiments, the fasteners 108 not only retain the coils 101A, 101B, but also aid in conducting the magnetic field produced by the coils 101A, 101B when the coils 101A, 101B are energized. The coils 101A, 101B may be energized substantially simultaneously or independently. More specifically, when the coils 101A, 101B are de-energized, the biasing member 213 can bias the movable armature 211 towards a first position. In the embodiment shown, the first position is away from the magnetic core 210. With the movable armature 211 biased towards the first position, the sealing member 212 can substantially seal and close the orifice 214, thereby closing off fluid flow through the valve 100. It should be appreciated that while the biasing member 213 is shown in the figures as comprising a spring, other types of biasing members may be used. Therefore, the present invention should not be limited to requiring a spring. In other embodiments, if the valve 100 is oriented properly, the weight of the movable armature 211 may be sufficient to seal the orifice 214 in the absence of the coils 101A, 101B being energized. In still further embodiments, the fluid pressure may act to seal the valve 100. This may be true if the orientation of the valve were reversed, i.e., the fluid enters the valve from the top 107, as shown in the figures. According to yet another embodiment of the invention, the valve 100 may include one or more permanent magnets (not shown) that provide a constant force on the movable armature 211 in the first direction.

Upon energizing the coils 101A, 101B, a magnetic flux is created by the coils 101A, 101B that acts on the movable armature 211 to overcome the biasing force provided by the biasing member 213 allowing the armature 211 to move within the housing 216 towards a second position, i.e., up towards the magnetic core 210, as shown in the figures. According to an embodiment of the invention, the magnetic core 210 remains substantially stationary during operation of the valve 100. According to an embodiment of the invention, the magnetic core 210 can be provided to direct and focus the magnetic flux produced by the coils 101A, 101B, as is generally known in the art.

While the embodiment shown in the figures comprises a normally closed valve, with the valve being sealed when the coils 101A, 101B are de-energized, it should be appreciated that in other embodiments, the valve 100 may comprise a normally open valve. In other words, the biasing member 213 may act on the movable armature 211 to bias the movable armature 211 and thus, the sealing member 212 away from the orifice 214. In this embodiment, upon energizing the coils 101A, 101B, the magnetic flux can be reversed from the direction described above and can overcome the biasing force of the biasing member 213 in order to seal the sealing member 212 against the orifice 214 to stop fluid flow through the valve 100.

As can be seen in FIG. 2, when the movable armature 211 is actuated away from the orifice 214 in order to open the valve 100, fluid can flow from one end 106 of the valve 100 to the other end 107 through the fluid channel 215. According to an embodiment of the invention, the fluid channel 215 is formed in both the magnetic core 210 and the movable armature 211. Furthermore, the housing 216 can provide a substantially fluid tight seal with the magnetic core 210 in order to prevent fluid from escaping between the movable armature 211 and the magnetic core 210. In this manner, fluid flowing through the valve 100 only contacts the interior of the removable cartridge 103. The housing 216 may be sealed in any number of ways and the particular method should not limit the scope of the present invention. The operation of solenoid operated poppet style valves is well known in the art and therefore, the discussion above is merely a summary of the general valve operation.

As discussed above, in many embodiments, it may be advantageous to replace the removable cartridge 103 after use. Alternatively, a user may have multiple removable cartridges 103, with only a single or limited number of base portions 10. Therefore, the removable cartridge 103 may remain inline on a system (not shown) with the coils 101A, 101B, and the cartridge receivers 104 being moved from one removable cartridge 103 to another, thereby reducing the number of base portions 10 required. Assembly of the valve 100 is described below according to one embodiment of the invention.

Figure 3:
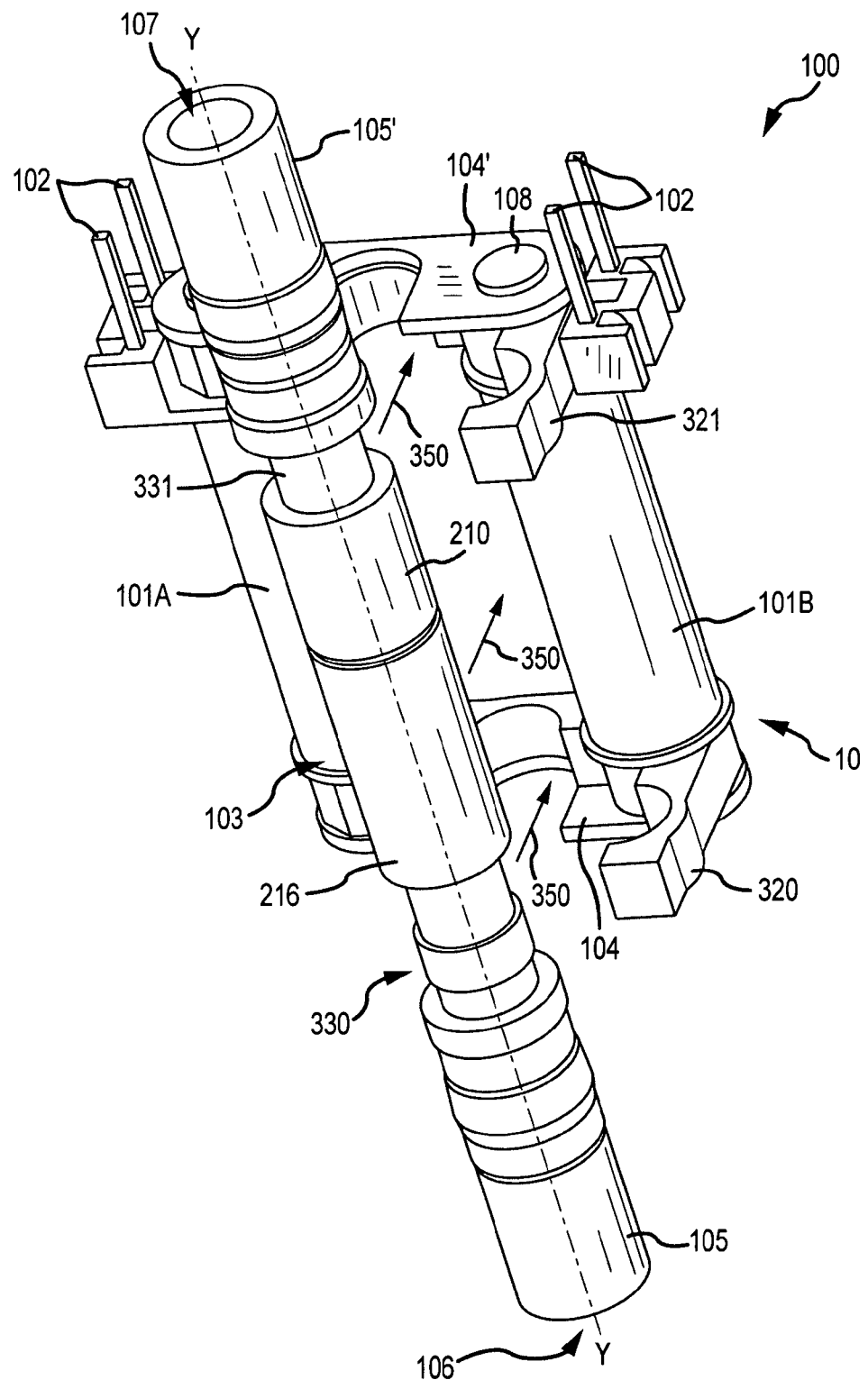
FIG. 3 shows the valve with the removable cartridge separated from the base portion of the valve according to an embodiment of the invention.
Figure 4:
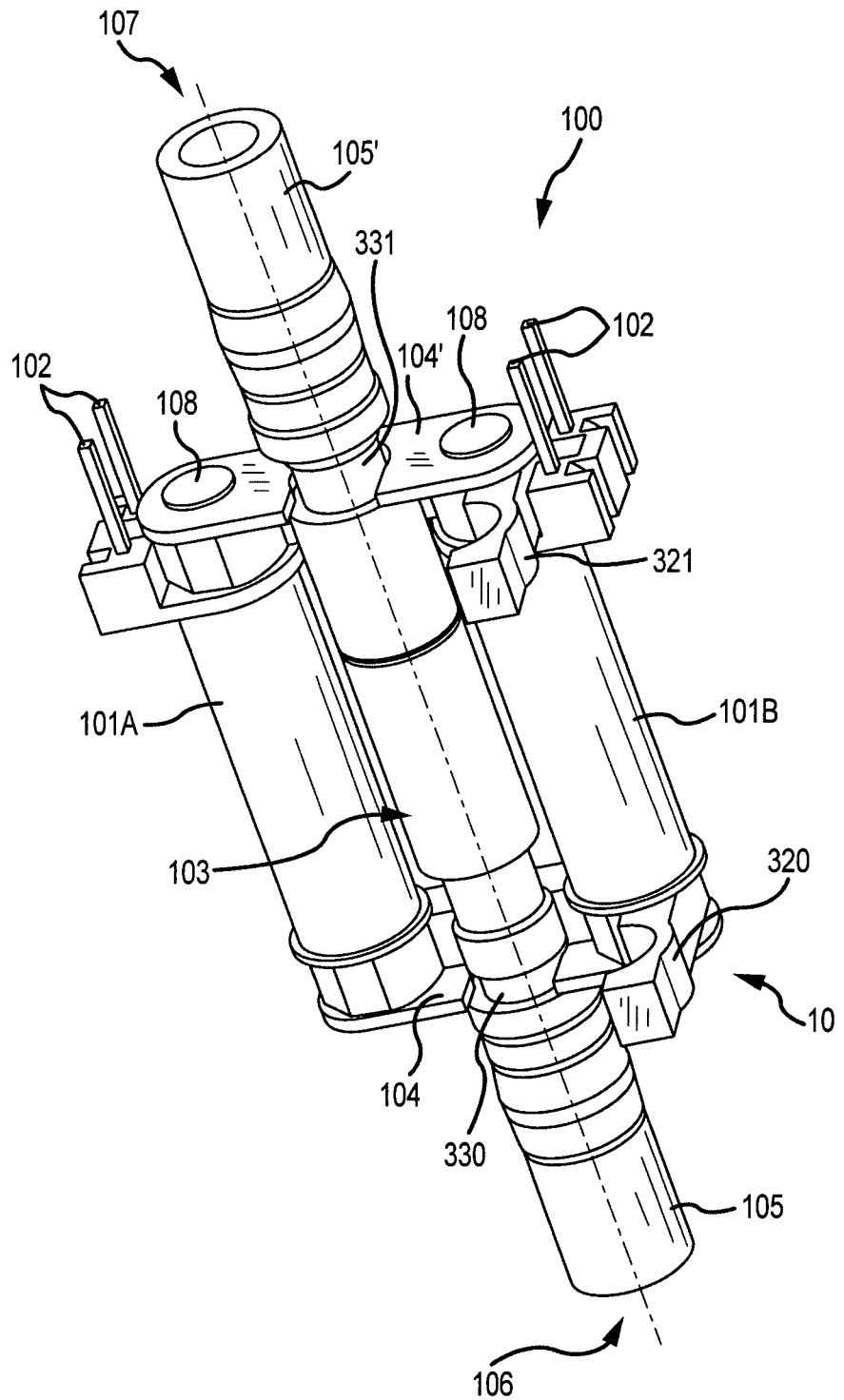
FIG. 4 shows the valve with the removable cartridge partially engaged with the base portion of the valve according to an embodiment of the invention.
Figure 5:
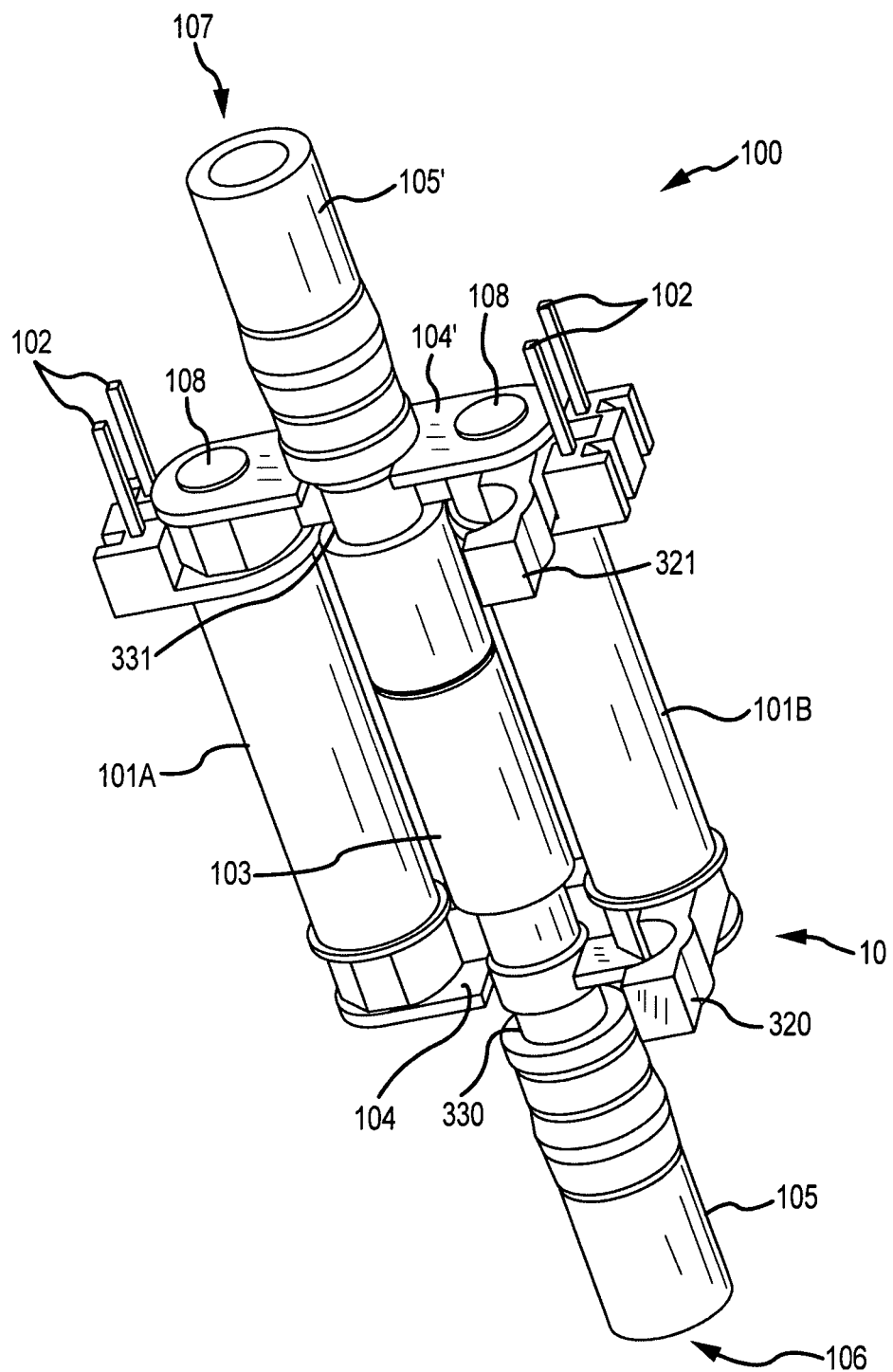
FIG. 5 shows the valve with the removable cartridge engaged with the base portion of the valve according to an embodiment of the invention.

FIG. 3 shows the valve 100 according to an embodiment of the invention. In the embodiment shown, the removable cartridge 103 is shown disengaged and separated from the base portion 10. As can be seen, the base portion 10, and more specifically, the cartridge receivers 104, 104', can include first and second latching arms 320, 321. The latching arms can provide a number of uses. According to an embodiment of the invention, the latching arms 320, 321 can be configured to help retain the removable cartridge 103 within the cartridge receivers 104, 104'. In addition, the latching arms 320, 321 can aid in creating and strengthening the magnetic field produced by the coils 101A, 101B. The latching arms 320, 321 are configured to move from a first position, which is shown in FIGS. 3, 4, and 5 to a second position, shown in FIGS. 1 & 2. In some embodiments, the latching arms 320, 321 may be coupled using the fasteners 108, for example. However, it should be appreciated that the latching arms 320, 321 may be coupled using other methods and the particular embodiment shown should not limit the scope of the present invention. With the latching arms 320, 321 in the first position, the removable cartridge 103 is free to be removed or inserted into the cartridge receivers 104. Although the latching arms 320, 321 are shown as being rotatably coupled to the second coil 101B, it should be appreciated that in other embodiments, the latching arms 320, 321 may be completely removable from the base portion 10. Furthermore, it should be appreciated that the latching arms 320, 321 are not required in all embodiments and therefore, some embodiments may omit the latching arms 320, 321.

Also shown in FIG. 3 are first and second reduced neck portions 330, 331 formed in the removable cartridge 103. The first reduced neck portion 330 is formed in the housing 216 that surrounds the movable armature 211; while the second reduced neck portion 331 is formed in the magnetic core 210. The reduced neck portions 330, 331 are adapted to fit within the cartridge receivers 104, 104'. According to an embodiment of the invention, the removable cartridge 103 is configured to be coupled to the base portion 10 in the general direction of the arrows 350. According to an embodiment of the invention, the arrows 350, and thus, the direction of coupling, is approximately perpendicular to the longitudinal axis Y-Y of the removable cartridge 103, i.e., the removable cartridge 103 is laterally inserted. One reason for this direction of coupling is due to the presence of the conduits 105, 105'. With the conduits 105, 105' coupled to the removable cartridge 103, the removable cartridge 103 cannot be slid into the cartridge receivers 104, 104' parallel to the longitudinal axis Y-Y as the entire conduit 105 would also need to slide through the cartridge receivers 104, 104'. This is often not practical due to the length of the conduits 105, 105'. While the conduits 105, 105' could be removed prior to coupling the removable cartridge 103 to the base portion 10, or may not be present during the coupling, providing a lateral insertion allows the removable cartridge 103 to be coupled to the base portion 10 regardless of whether the conduits 105, 105' are present. In many embodiments, the lateral insertion of the removable cartridge 103 can also be faster than a longitudinal insertion due to the shorter distance and easier access. Furthermore, providing a lateral insertion allows the reduced neck portions 330, 331 to fit within the cartridge receivers 104, 104' and prevent the removable cartridge 103 from sliding with respect to the base portion 10.

FIG. 4 shows the valve 100 with the removable cartridge 103 partially engaged with the base portion 10. As can be seen, the reduced neck portions 330, 331 of the removable cartridge 103 are sized and configured to engage the cartridge receivers 104, 104'. However, in the position shown in FIG. 4, the removable cartridge 103 may still be relatively loose and thus, is only partially engaged in the cartridge receivers 104, 104'. In order for the removable cartridge 103 to fully engage the base portion 10, the removable cartridge 103 is moved down as shown in the figures to the position shown in FIG. 5. In some embodiments, the removable cartridge 103 does not have to move down to the position shown in FIG. 5, but rather, the latching arms 320, 321 can be moved to their second position with the removable cartridge 103 in the position shown in FIG. 4.

FIG. 5 shows the valve 100 with the removable cartridge 103 fully engaged with the cartridge receivers 104. The last step to coupling the valve 100 together is to move the latching arms 320, 321 to the second position as shown in FIG. 1. However, it should be appreciated that the latching arms 320, 321 are optional and therefore, this step may be omitted. The latching arms 320, 321 may be held in the second position by friction fit, snap fit, a spring force, etc. Those skilled in the art will readily recognize alternative methods for retaining the latching arms 320, 321 in the second position. Therefore, the particular method of retaining the latching arms 320, 321 in a specific position should not limit the scope of the present invention. In some embodiments, the latching arms 320, 321 may include springs or other biasing members (not shown) that bias the latching arms 320, 321 towards the second position. Therefore, a user/operator may need to overcome the biasing force to move the latching arms 320, 321 to the first position with the basing member automatically moving the latching arms 320, 321 to the second position once the user/operator releases the latching arm.

Once the latching arms 320, 321 are moved to the second position, the removable cartridge 103 is securely held in the cartridge receivers 104, 104'. Therefore, the valve 100 can function as described above. Once it is desired to remove the removable cartridge 103, the process as described above can simply be reversed. The removed cartridge 103 can then be discarded and a new cartridge 103 can be provided.

Figure 6:
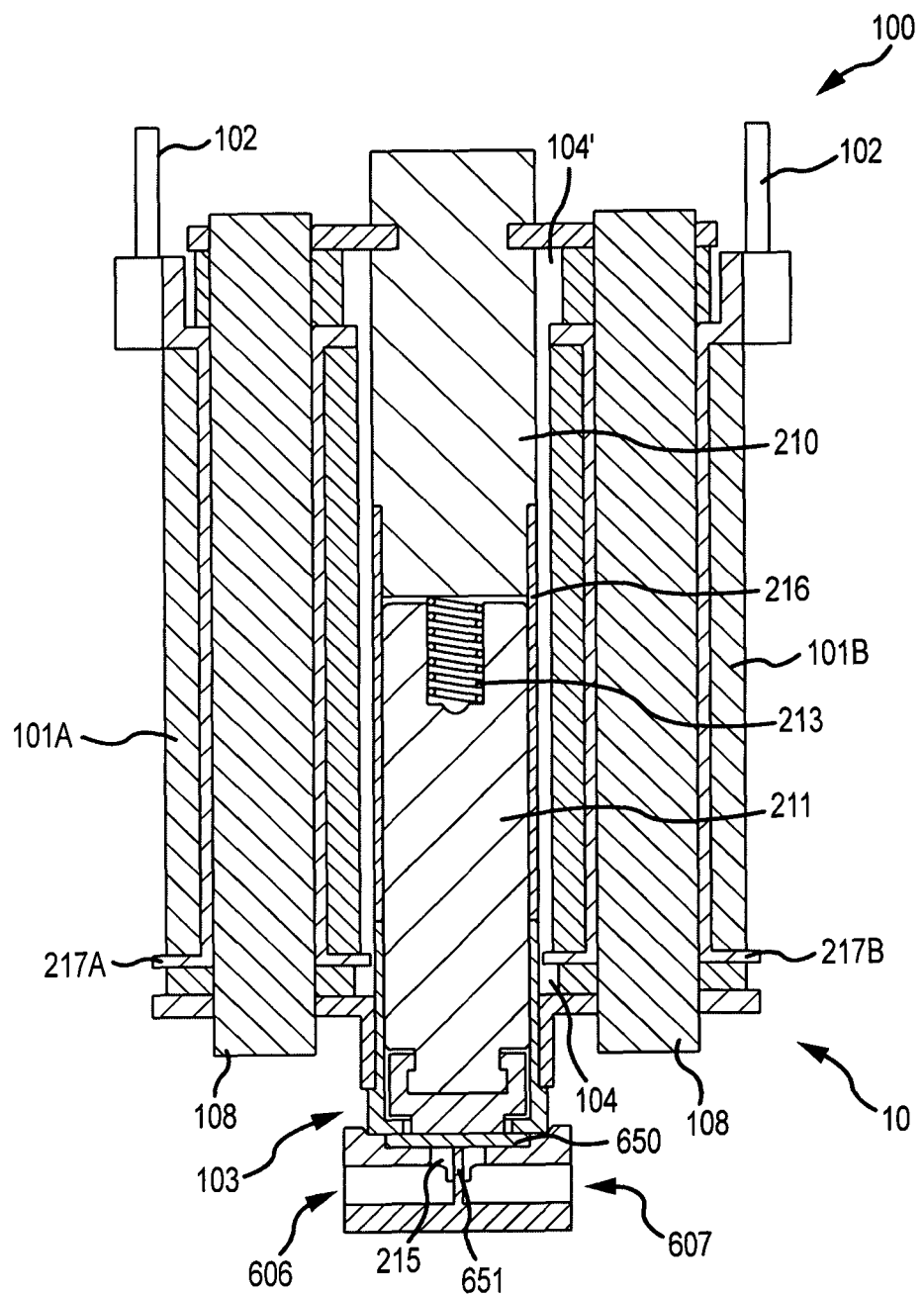
FIG. 6 shows a cross-sectional view of the valve according to an embodiment of the invention.

FIG. 6 shows a cross-sectional view of the valve 100 according to another embodiment of the invention. The embodiment of the valve 100 shown in FIG. 6 differs from the previously described valves in that the fluid flow path 215 is isolated from the magnetic core 210 and the movable armature 211 by a diaphragm 650. According to an embodiment of the invention, the diaphragm 650 engages a valve seat 651 in order to seal the fluid inlet 606 from the fluid outlet 607. It should be appreciated that the particular orientation of the fluid inlet 606 and the fluid outlet 607 are merely shown as an example and the orientation could easily be reversed.

It should be appreciated that while the fluid inlet 606 and the fluid outlet 607 are separated from the magnetic core 210 and the movable armature 211, the diaphragm 650 and the valve seat 651 along with the inlet and outlet 106, 107 can still comprise a portion of the removable cartridge 103. Therefore, the benefits of the removable cartridge that are outlined above are still applicable for the valve 100 shown in FIG. 6. In use, the fluid inlet 606 and the fluid outlet 607 may be coupled to conduits (not shown) according to known methods.

According to an embodiment of the invention, the diaphragm 650 can be coupled to the movable armature 211. Therefore, when the first and second coils 101A, 101B are energized and the movable armature 211 is moved from the first position towards the second position, the diaphragm 650 can be moved away from the valve seat 651 to open a fluid communication path between the inlet 606 and the outlet 607. When the coils 101A, 101B are de-energized, the biasing member 213 biases the movable armature 211 back towards the first position thereby returning the diaphragm 650 to the valve seat 651 and closing the fluid inlet 606 from the fluid outlet 607.

Figure 7:
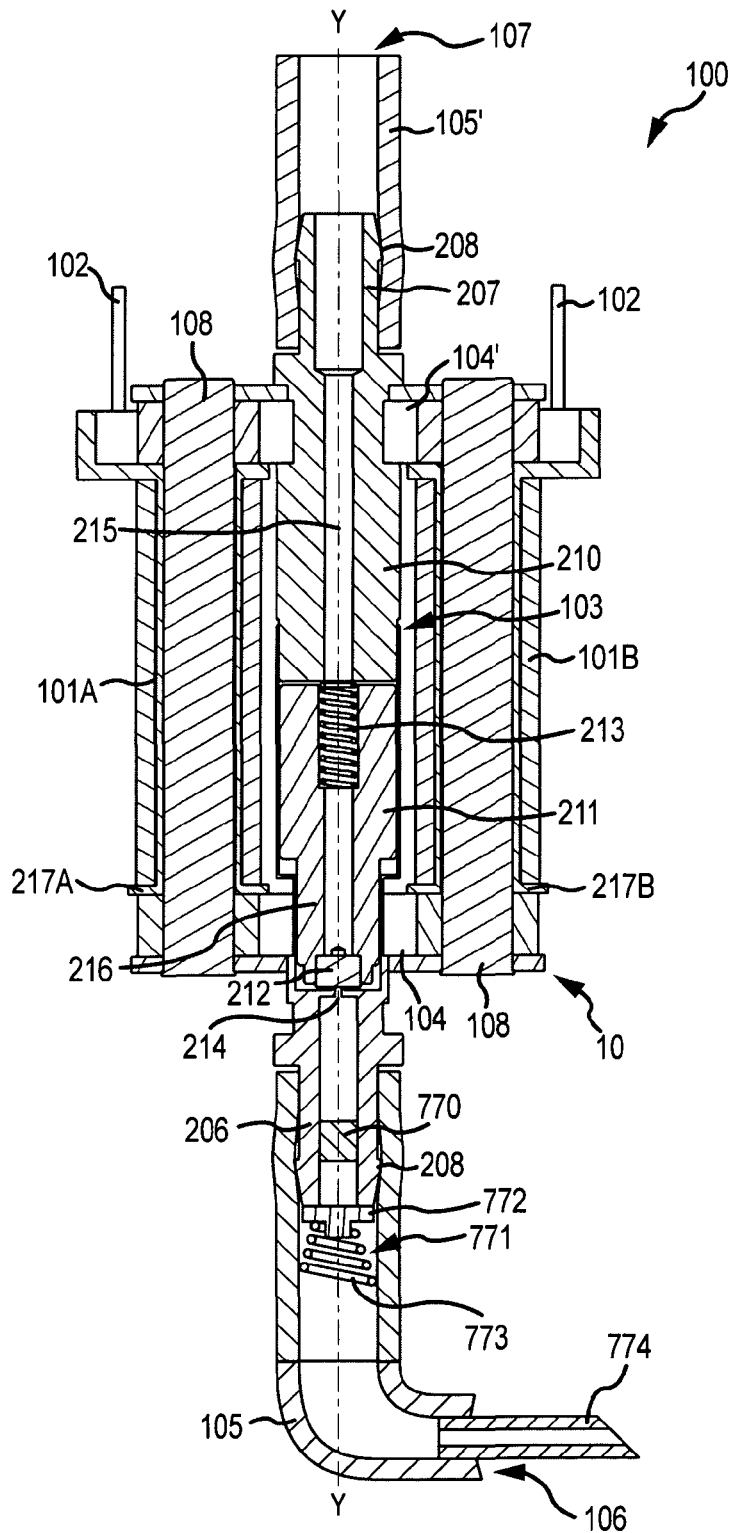
FIG. 7 shows a cross-sectional view of the valve according to another embodiment of the invention.

FIG. 7 shows a cross-sectional view of the valve 100 according to yet another embodiment of the invention. In the previously described embodiments, the removable cartridge 103 could be inserted into an existing system. In other words, the conduits 105, 105' may already be present or may remain in the system after the removable cartridge 103 is removed. However, in other embodiments, the conduits 105, 105' may be removable along with the removable cartridge 103. Therefore, the conduits 105, 105' may be provided as a package with the removable cartridge 103. This may be particularly useful in sterile environments where all components that come into fluid contact need to be properly disposed. For example, in embodiments where needles are involved, the system may be considered contaminated and should be discarded after a single use.

In FIG. 7, the removable cartridge 103 includes the first and second conduits 105, 105' along with the previously described components. Therefore, the conduits 105, 105' may not comprise removable components. In addition, it can be seen that the removable cartridge 103 includes a number of other components not shown in the previous embodiments. It should be appreciated that while the additional components are provided in a single embodiment that each of the additional components may be provided separately or in various other combinations. Furthermore, the particular order of the components should not limit the scope of the present embodiment.

In addition to the previously described components, the embodiment shown in FIG. 7 includes a filter 770, a check valve 771, and a needle 774. It should be appreciated that because each of the additional components is included as a portion of the removable cartridge 103 that each component may be removed when the removable cartridge 103 is removed as described above. The filter 770 is shown as being positioned within the nozzle 206; however, it should be appreciated that the filter 770 may be positioned anywhere in the fluid flow path 215 and is not limited to being positioned in the nozzle 206. As shown, the check valve 771 includes a movable member 772 and a biasing member 773. According to the embodiment shown, the check valve 771 allows fluid to flow from the second end 107 to the first end 106 so long as the pressure is great enough to overcome the biasing force of the biasing member 773. With the biasing member 773, fluid is substantially prevented from traveling from the first end 106 towards the second end 107.

According to an embodiment of the invention, the removable cartridge 103 also includes a needle 774. The needle 774 may be provided for medical uses, for example. As is generally known, needles are often only used a single time. Therefore, with the needle 774 comprising a portion of the removable cartridge 103, the needle 774 is removed with the removable cartridge 103. It should be appreciated that in embodiments including the needle 774, the second conduit 105' may be coupled to a disposable reservoir, for example.

The embodiment shown in FIG. 7 illustrates the wide applicability of the present invention. Furthermore, the embodiment shown in FIG. 7 illustrates the usefulness of the lateral insertion of the removable cartridge 103 that is described above. As can be appreciated with the conduits 105, 105' along with the additional components comprising a portion of the removable cartridge 103, it could be extremely impractical, if not impossible, to insert the removable cartridge 103 along the longitudinal axis Y-Y.

The valve 100 as described above can advantageously be used in environments where the fluid contacting elements are required to remain sanitary. The removable cartridge 103 can be easily coupled and removed from the base portion 10 of the valve 100. Therefore, the base portion 10, which includes the coils 101A, 101B, can be reused. Furthermore, because the coils 101A, 101B are provided as completely separate elements from the removable cartridge 103, there is substantially less chance of the fluid flowing through the valve 100 damaging the coils 101A, 101B. This is in contrast to prior art approaches where the coils are only separated from the fluid by a seal, which can easily wear out and leak, thereby damaging the coils.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other valves, and not just to the embodiments described above and shown in the accompanying figures. Accordingly, the scope of the invention should be determined from the following claims.

We claim:

1. A method for forming a valve including a base portion including two or more solenoid coils and one or more cartridge receivers, and one or more removable cartridges, wherein at least one of the one or more removable cartridges includes a magnetic core and a movable armature, the method comprising the step of:

inserting a portion of the at least one of the one or more removable cartridges into the one or more cartridge receivers between the two or more solenoid coils.

2. The method of claim 1, further comprising the step of moving one or more latching arms coupled to the one or more cartridge receivers from a first position to a second position to retain the removable cartridge in the one or more cartridge receivers.

3. The method of claim 1, wherein the step of inserting a portion of the removable cartridge comprises engaging the removable cartridge with the one or more cartridge receivers in a direction perpendicular to a longitudinal axis of the removable cartridge.

4. The method of claim 1, wherein the step of inserting a portion of the removable cartridge into the one or more cartridge receivers comprising inserting a first and second reduced neck portion into the one or more cartridge receiver.

5. The method of claim 1, further comprising the step of coupling one or more fluid conduits to a first and second nozzle coupled to the removable cartridge.

6. A valve (100), comprising:
a base portion (10) including two or more solenoid coils (101A, 101B) and one or more cartridge receivers (104, 104') coupled to the two or more solenoid coils (101A, 101B); and
one or more removable cartridges (103), wherein at least one of the one or more removable cartridges includes a magnetic core (210) and a movable armature (211), and is positioned between the two or more solenoid coils and is adapted to removably engage the one or more cartridge receivers (104, 104').

7. The valve (100) of claim 6, further comprising one or more latching arms (320, 321) adapted to retain the removable cartridge (103) in the cartridge receivers (104, 104').

8. The valve (100) of claim 6, wherein the removable cartridge (103) further comprises a sealing member (212), and a fluid orifice (214).

9. The valve (100) of claim 6, further comprising a fluid flow path (215) formed in the magnetic core (210) and the movable armature (211).

10. The valve (100) of claim 9, wherein the removable cartridge (103) is adapted to engage the one or more cartridge receivers (104, 104') in a direction generally perpendicular to the fluid flow path (215).

11. The valve (100) of claim 6, further comprising a housing (216) substantially surrounding the movable armature (211) and forming a fluid tight seal with the magnetic core (210).

12. The valve (100) of claim 6, further comprising a diaphragm (650) coupled to the movable armature (211) and adapted to engage a valve seat (651) when the movable armature (211) is in a first position.

13. The valve (100) of claim 12, wherein the diaphragm (650) closes a fluid flow path (215) between a fluid inlet (606) and a fluid outlet (607) when engaged with the valve seat (651).

14. The valve (100) of claim 6, further comprising a biasing member (213) coupled to the movable armature (211) and adapted to bias the movable armature (211) in a first direction.

15. The valve (100) of claim 6, further comprising a first and a second nozzle (206, 207) extending from a first and a second end (106, 107) of the removable cartridge (103).

16. The valve (100) of claim 6, wherein the removable cartridge (103) further comprises a filter (770).

17. The valve (100) of claim 6, wherein the removable cartridge (103) further comprises a check valve (771).

18. The valve (100) of claim 6, wherein the removable cartridge (103) further comprises a needle (774).

19. The valve (100) of claim 6, wherein the removable cartridge (103) further comprises one or more fluid conduits (105, 105').

* * * * *